Jan. 13, 1959

C. B. CURRIE ET AL 2,868,457

COMBINATION VALVE CONTROL

Filed June 6, 1955

INVENTOR.
COURTLAND B. CURRIE
ROGER S. LOVELAND
BY

ATTORNEY

INVENTOR.
COURTLAND B. CURRIE
ROGER S. LOVELAND
BY
ATTORNEY

United States Patent Office 2,868,457
Patented Jan. 13, 1959

2,868,457

COMBINATION VALVE CONTROL

Courtland B. Currie, Los Angeles, and Roger S. Loveland, Temple City, Calif., assignors to Minneapolis-Honeywell Regulator Company, Minneapolis, Minn., a corporation of Delaware Application June 6, 1955, Serial No. 513,188

6 Claims. (Cl. 236—48)

This invention relates to valves of the type used to control the flow of gas to a furnace or the like in response to the temperature of the space to be heated by the furnace or in response to time or in response to some other condition.

Valves of this general type are well known in the art so the novelty in the invention to be described hereinafter will of necessity reside in the particular combination and arrangement of basically old elements per se resulting in a new and novel control device.

One of the objects of the invention is to provide a combination valve body that is adapted to be sold with one control unit therein but adapted to be modified at a later date to add a second automatic control unit thereto.

Another object of the invention is to provide a temperature responsive valve subassembly that may be inserted in a valve body by mechanically unskilled householders.

A further object of the invention is to provide a valve construction which allows for swelling and contraction of the sealing portion thereof and which will not stick in its closed position.

A still further object of the invention is to provide a valve which is of compact design and of simple and inexpensive construction but which is reliable in operation and may readily be adjusted in the event adjustment is deemed desirable.

Still further objects of the invention will become apparent on reading the following detailed description of the invention in conjunction with the accompanying drawings, wherein.

Figures 1, 4:
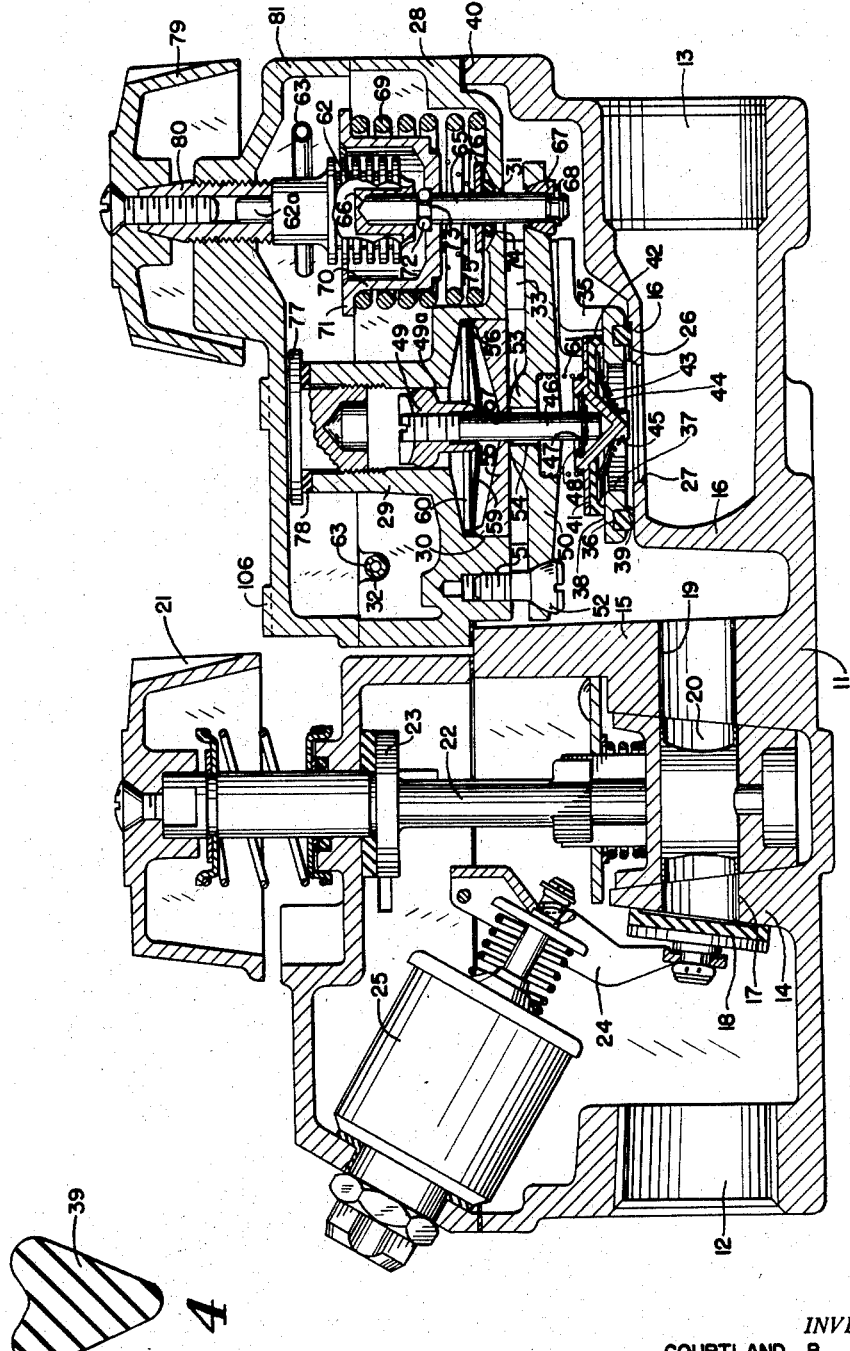
Figure 1 is a vertical sectional view of the combination valve taken along its longitudinal axis.
Figure 4 is an enlarged cross-sectional view of a valve seat sealing ring.

As can best be seen in Figure 1 of the drawing, the combination valve consists of a valve body 11 having an inlet 12, an outlet 13 and three partitions 14, 15 and 16 therebetween.

The partition 14 has an opening 17 therethrough which is controlled by or adapted to be closed by a valve 18, while the partition 15 has an opening therethrough that is controlled by a plug valve 20.

As the valve mechanism between the inlet 12 and partition 15 forms no part of this invention, other than in the general combination, this portion being disclosed and claimed in a copending application of Melvin G. Sogge, Serial No. 325,855 and filed December 13, 1952, now Patent Number 2,746,472, it may suffice to say that the plug valve 20 is operable between "closed," "pilot," and "open" positions by means of a control knob 21. The knob 21 is axially slidable with respect to the plug valve 20 by a splined connection between the actuating shaft 22, on which the knob is mounted, and the plug valve so that an annular abutment 23 can engage a pivoted lever 24, carrying the valve 18, to pivot the valve open. Upon opening the valve, an armature (not shown) in an electromagnet housing 25, is brought into engagement with an electromagnet (not shown) in the housing which will hold the valve in its "open" position provided the electromagnet is energized by a heated thermocouple (not shown) in a conventional manner.

A partition 16 has a valve seat 26 milled therein around an opening 27 through the partition. This seat 26 is adapted to directly receive a valve head operated by any suitable mechanism, power unit, or condition responsive means that may be mounted on the portion of the valve body 11 between the partition 15 and the outlet 13. If desired, the combination valve body may be made with only the safety valve and plug valve therein and with a plate covering the portion of the body between the partition 15 and the outlet 13.

The novelty in this invention is deemed to lie in the thermostatically operated valve and seat subassembly that may be substituted for the plate, above mentioned, to provide an automatic thermostatically controlled valve arrangement in conjunction with the safety valve 18 and plug valve 20.

This valve subassembly consists of a generally cup-shaped casting 28 having an upwardly extending tubular portion 29 which terminates in an enlarged bore 30 formed in the bottom of the casting, a small bore 31 through the bottom of the casting, and a notch 32 in the top of a sidewall of the casting.

Secured to a pair of bosses 33 extending downwardly from the bottom of the casting 28, by means of bolts 34, is a bracket member 35 which has an annular groove 36 in the bottom surface thereof which surrounds an opening 37 in the bracket in axial alignment with the opening 27 in the partition 16. The top of the bracket 35 is machined to provide a valve seat 38. Mounted in the annular groove 36, is a generally heart-shaped in cross-section sealing gasket 39 (see enlargement of Figure 4) that is highly compressible to assure sufficient movement of the casting 28 with respect to the valve body 11, after contact is made between the gasket 39 and seat 38, to cause a gastight seal therebetween on a gasket 40 located between the members 28 and 11.

The valve head 41, having a ribbed sealing disc 42 of rubber or similar material resiliently held against its lower face by means of a light metallic washer 43 and a cone-shaped helical spring 44, is supported by the bracket member 35. The helical compression spring 44 is retained on the valve head by means of a split ring 45 engaging in an annular groove near the lower end of the valve head. This arrangement permits swelling and contraction of the disc 42 without damage thereto. A valve stem 46, having an abutment ring 47 in an annular groove at its lower end, is held in a socket in the upper side of the valve head by means of a washer 48 surrounding the stem 46 and abutting the upper surface of the abutment ring 47, the washer 48 being held in the head by rolling over the inner edge of the socket portion of the valve head. The stem is threaded at its upper end and adjustably carries an internally threaded bearing sleeve 49. The sleeve 49 has rounded beads or buttons 49a which slide freely along the inner surface of the tubular portion 29 to vertically guide the valve to and from the valve seat.

The valve is actuated by means of a pivoted lever 50 pivoted at its left hand end (as viewed in Figure 1) to the casting 28 by means of a screw 51 having a rounded head 52. The lever 50 has a rounded pivot portion 53 intermediate its ends with a large opening 54 therethrough which permits the stem 46 to freely pass therethrough.

Resting on the pivot or bearing portions 53 of the lever 50 is an actuator disc 55 having an annular rib 56 thereon spaced inwardly from the bore 30. An axial opening 57 through the actuator disc 55 is only slightly larger than the diameter of the stem 46 so that it additionally guides the vertical movement of the valve stem 46 and the valve carried by the stem, the diameter of the actuating disc 55 also being only slightly smaller than the diameter of the bore 30 to aid in this guiding function. A snap disc 59 of conventional construction is located between the annular rib 56 on the disc 55 and a pivot ring 60 located at the upper end or base of the bore 30. The ring contacts the snap disc outwardly of the annular rib 56 so that upward movement of the actuator disc 55 will cause the center of the disc to snap upwardly and thus raise the sleeve 49 located above the center portion of the snap disc.

The valve 41 is normally held against the valve seat 38 by means of a spring 61 and by the weight of the valve, the snap disc 59 normally being flexed downwardly. The valve is adapted to be actuated to its open position by means of a temperature responsive unit consisting of an expansible bellows 62 connected by a capillary tube 63 to a bulb 64 filled with a suitable temperature expandable fluid. The unit is operably connected to the lever 50 by means of a plunger 65 resting at its upper end in a socket 66 formed in the closed movable end of the bellows 62 and carrying a rounded abutment head 67 at its lower end and retained on the lower end by means of a clip washer 68 located in an annular groove in the plunger 65. The plunger 65 is normally biased upwardly by means of a heavy coiled spring 69 extending between the upper surface of the bottom of casting 28 and the outwardly extending flange 71 of a cup-shaped abutment member 70. The cup-shaped member 70 is anchored on the plunger 65 by means of an abutment ring 72 located in an annular groove 73 in the plunger 65. It is thus seen that the spring 69 will normally tend to pivot the lever 50 about the pivot 52 and move the valve to its open position by lifting the actuator disc 55 against the action of the springs 61 and snap disc 59. However, the valve is free to move to its closed position under the bias of the snap disc and the spring 61 when the spring 69 is overpowered by expansion of the bellows 62 upon a rise in temperature around the bulb 64.

The casting 28 is sealed against leakage of gas through the plunger opening 31 by means of an O-ring 74, which is resiliently biased against the bottom of the casting 28 by means of a compression spring 75 extending between the bottom of the cup-shaped member 70 and a washer 76 bearing on the top of the O-ring 74. The gas that would normally leak around the actuator disc 55 and the guide sleeve 49 is also prevented from escaping from the valve body by means of a threaded plug 77 screwed into the sleeve 29, with a gasket 78 therebetween.

Figure 2:
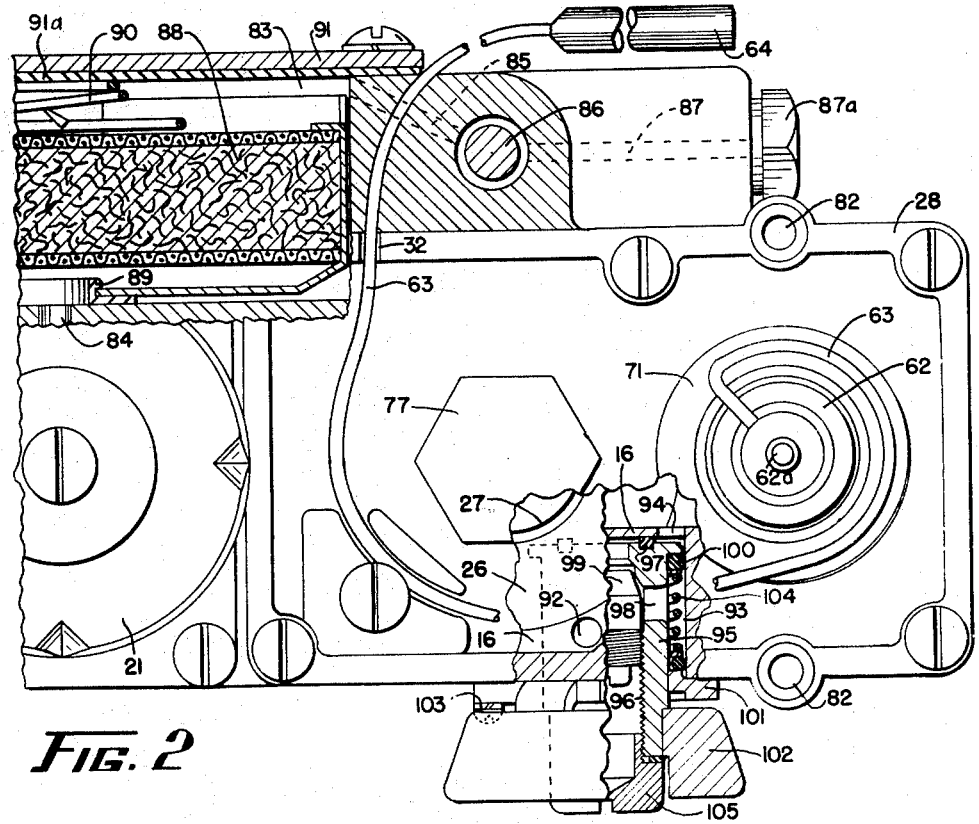
Figure 2 is an enlarged plan view of the invention with portions thereof broken away, the thermostatic valve's top casting removed and portions of the valve shown in cross-section.
Figure 3:
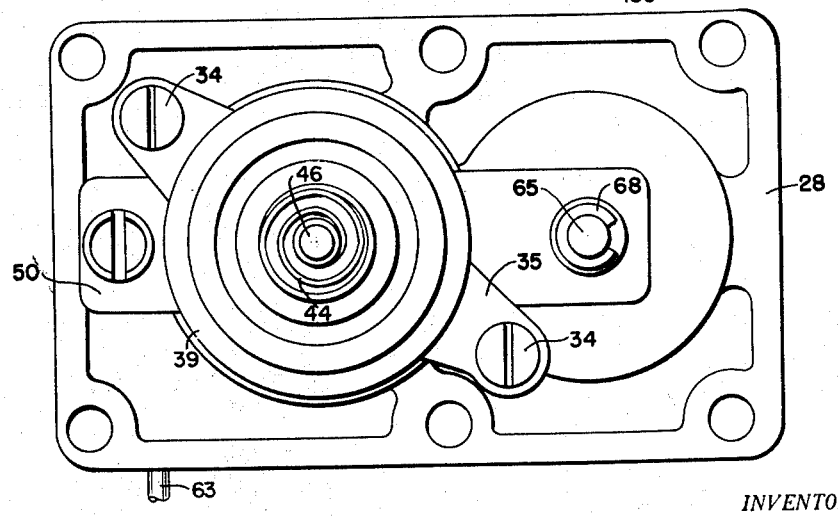
Figure 3 is an enlarged bottom view of the thermostatic valve subassembly.

The temperature at which the bellows and bulb temperature sensing unit will actuate the valve, may be adjusted by a control knob 79 having a shaft 80 which is screw threaded through a cover 81, which, in turn, is secured to the casting 28 by means of bolts (not shown) extending through openings (not shown) in the cover 81 in alignment with threaded openings 82 (Figure 2) in the casting 28. The stem 80 is hollow and swivelly surrounds a stud 62a on the closed upper end of the bellows 62. Rotation of the knob 79 will thus cause inward or outward movement of the adjustably fixed end of the bellows 62 to adjust the control point of the thermostatic mechanism.

A chamber 83 is formed in the side of the body 11. A passage 84 leads from the chamber 83 to the plug valve 20 while a passage 85 leads from the chamber 83 to a needle valve 86 and a passage 87 leads from the needle valve 86 to a pipe coupling 87a adapted to receive a pipe from a pilot burner, not shown. A filter 88, having a rubber grommet 89 on one side thereof surrounding the passage 84, is resiliently biased into sealing engagement with the wall of the chamber 83 by means of a compression spring 90. The side opening of the chamber 83 is sealed by means of a plate 91 and a gasket 91a suitably secured over the chamber 83.

A bypass around the valve 41 and opening 27 consists of a generally vertical passage 92 extending from the top of the partition 16 to a chamber 93 formed in the side wall of the body 11 and a transversely extending passage 94 extending from the chamber 93 to the outlet side of the partition 16. A valve 95 having an internally threaded axial bore 96, has a sealing ring 97 surrounding the inner end of the bore 96 and radial openings 98 which establish communication between the chamber 93 and the bore 96. A needle valve 99 is adjustable in the bore 96 to regulate the amount of gas that can flow from the chamber 93 through the passage 98 and through the opening 94 when the sealing ring 97 is off of the inner end wall of the chamber 93. Gas is prevented from leaking from the chamber 93 to the opening 94, without flowing past the valve 99, by means of two spaced O-rings 100 which are resiliently biased against a flange on the inner end of the valve 95 and against a cover plate 101 suitably secured to the body 11. The compression of the O-rings 100 causes a gastight seal between the outer wall of the valve 95 and the wall of the chamber 93. The valve is movable to its open position by outwardly pulling on a knob 102 secured to the valve 95 and turning the knob 102 so as to bring a land portion (not shown) of the knob 102 into abutting relationship with the top of the head of screws 103 which hold the plate 101 on the body 11. The sealing ring 97 will remain out of engagement with the bottom of the chamber 93 until the knob 102 is rotated to its initial position whereby the spring 104 is free to move the valve 95 into sealing engagement with the end wall of the chamber 93. A plug 105, threaded into the outer end of the valve member 95, may be removed to adjust the rate of flow by turning the valve 99.

*Operation*

The operation of the combination valve is deemed to be apparent from the disclosure. The valve 18 may be opened by rotating the knob 21 to a "pilot position," which is indicated by the position of the knob 21 with respect to a pointer 106, and then moving the knob inwardly to pivot the valve 18 to its open position. This permits gas to flow from the inlet 12 through the plug valve 20 through the filter 88 to a pilot burner. Then, when a thermocouple heated by the pilot burner is sufficiently energized as to cause the electromagnet unit 25 to hold the valve 18 open, the knob may be released to return to its initial position and the plug valve 20 may then be rotated to its "on" position, permitting gas to flow to the valve 41 and to the valve 95. If the valve 95 is in its "open" position, gas will flow at a minimum flow rate determined by the valve 99 to a main burner connected to the outlet 13. Also, if the bulb 64 connected to the bellows 62 is sufficiently cool as to permit the bellows 62 to contract, the spring 69 will move the lever 50 upwardly or counterclockwise about the pivot 52 to actuate the snap-acting mechanism and thus lift the valve 41 to its open position. If as the valve 41 lifts, the valve disc 42 should stick to the surface 38, the disc will flex downwardly at its outer peripheral edge so that there will be a stretching of the disc radially, resulting in a pull on the peripheral edge of the disc radially inwardly as well as away from the seat 38, due to the fact that the edge of the disc 42 would be tending to swing in an arc rather than lengthen in radius equal to the hypoteneuse of a right triangle having the distance the valve 41 moved as one leg thereof. This causes the valve to break free of the valve seat more easily.

With the particular arrangement of the valve guiding elements and the pivotal connections between the actuator for the valve elements, it is seen that the valve will always properly seat and very little friction is developed by the valve actuating mechanism in its entirety and a very reliable operating device is provided.

Should there be any necessity for a recalibration of the valve, it is a simple matter to remove the cover 81 as the adjusting screw 80 will lift right off of the stud 62a and expose the bellows and the cap 77. Removal of the cap 77 will permit ready adjustment of the length or position of the abutment member 49 on the stem 46 which will adjust the operating differential of the snap acting mechanism.

While we have described a preferred embodiment of the invention, it is to be understood that the scope of the invention is to be determined solely from the appended claims.

We claim:

1. A valve comprising a valve body having an inlet and an outlet and a valve seat therebetween, an opening in a side of said body with the outer peripheral edge of said opening being substantially parallel with the surface of said valve seat, a valve subassembly having a cup-shaped housing with a peripheral surface coextensive with and registerable with said peripheral edge of said opening, a valve seat member carried by said housing and substantially parallel to said peripheral surface, said member having an opening therethrough aligned with an opening in said valve seat, a compressible sealing ring between said valve seat and said valve seat member, a second valve seat on said valve seat member, a valve movably mounted in said housing and adapted to engage said second valve seat, condition responsive means in said cup-shaped housing for actuating said valve and laterally off-set therefrom, snap-acting means operably associated with said valve, and a lever pivoted at one end thereof to said housing and at the other end to said condition responsive means, said lever having operating contact intermediate its ends with said snap-acting means.

2. A valve assembly comprising a cup-shaped housing having a tubular extension projecting from the bottom thereof and through the interior thereof, said tubular extension having a threaded upper end and terminating in a large bore in the bottom of the housing, a removable closure sealing said upper end of said extension, a valve seat secured to the bottom of said housing below said bore, a valve movable to and from said seat and having a stem extending into said extension, guide means slidable in said extension and adjustable on said stem, power means located within a portion of the cup of said housing and having an actuator extending through a hole in the bottom of said housing, snap-acting means in said bore and engaging said guide means, and mechanical means between said actuator and said snap-acting means for actuating said valve by said power means.

3. A valve assembly comprising a cup-shaped housing having a tubular extension projecting from the bottom thereof and through the interior thereof, said tubular extension having a threaded upper end and terminating in a large bore in the bottom of the housing, a removable closure sealing said upper end of said extension, a valve seat secured to the bottom of said housing below said bore, a valve movable to and from said seat and having a stem extending into said extension, said valve having a resiliently held flexible disc thereon, power means located within said housing and having an actuator extending through a hole in the bottom of said housing, and mechanical means including snap-action means in said bore extending between said actuator and said stem for actuating said valve by said power means.

4. A valve comprising a valve body having an inlet and an outlet and a valve seat therebetween, an opening in a side of said body with the outer peripheral edge of said opening being substantially flat, a valve subassembly having a valve seat member mounted in said body and on said peripheral edge and cooperable with said valve seat to control fluid flow therethrough, a valve cooperable with said valve seat member, said valve having a washer-shaped disc of flexible material thereon for sealingly engaging said valve seat, resilient means carried by said valve and bearing against said disc along an annular line substantially midway between its inner and outer peripheries and extending substantially around said disc to normally hold said disc against said valve but permitting axial flexing of the disc upon opening movement of the valve when the disc is sticking to the valve seat and thus causing a radial and axial unseating pull on the disc portion engaging the seat, and snap-acting control means for actuating said valve.

5. A valve sub-assembly comprising a valve housing having a valve seat secured thereto, a valve movably mounted in said housing and cooperable with said valve seat to control fluid flow therethrough, said valve having a washer-shaped disc of flexible material thereon for sealingly engaging said valve seat and means carried by said valve and bearing at its outer edge against said disc only along a line extending substantially around and spaced inwardly from the outer edge of said disc to normally hold said disc against said valve but permitting swelling and axial flexing of the disc over the outer edge of said means upon opening movement of the valve when the disc is sticking to the valve seat and thus causing a radially inward and axial unseating pull on the disc portion engaging the seat, and condition responsive means for actuating said valve.

6. A valve comprising a valve body having an inlet and an outlet and a valve seat therebetween, an opening in a side of said body with the outer peripheral edge of said opening being substantially flat, a valve movably mounted in said body and cooperable with said valve seat to control fluid flow therethrough, said valve having a washer-shaped disc of flexible material with an annular rib thereon at its outer periphery for sealingly engaging said valve seat and means carried by said valve and bearing against said disc only along a line extending substantially around and spaced inwardly from the outer periphery of said disc to normally hold said disc against said valve but permitting longitudinal flexing of the disc upon opening movement of the valve when the disc is sticking to the valve seat and thus causing a radially inward and axial unseating pull on the annular rib engaging the seat.

References Cited in the file of this patent

UNITED STATES PATENTS

| 1,211,877 | Quinn | Jan. 9, 1917 |
| 1,325,896 | Long | Dec. 23, 1919 |
| 1,439,750 | Nelson | Dec. 26, 1922 |
| 1,737,585 | Gold | Dec. 3, 1929 |
| 2,587,480 | Johnson et al. | Feb. 26, 1952 |
| 2,664,246 | Ray | Dec. 29, 1953 |
| 2,743,871 | Heiser et al. | May 1, 1956 |

FOREIGN PATENTS

| 560,268 | France | July 4, 1923 |